United States Patent [19]

Maehara et al.

[11] Patent Number: 4,472,559

[45] Date of Patent: Sep. 18, 1984

[54] PROCESS FOR PRODUCING POLYBUTADIENE RUBBER WITH ENHANCED MECHANICAL STRENGTH

[75] Inventors: Nobunori Maehara; Norihumi Utada, both of Ichihara; Taiji Oda, Chiba; Hidetomo Ashitaka, Ichihara; Hideo Ishikawa, Chiba, all of Japan

[73] Assignee: Ube Industries, Ltd., Yamaguchi, Japan

[21] Appl. No.: 451,756

[22] Filed: Dec. 21, 1982

[30] Foreign Application Priority Data

Dec. 24, 1981 [JP] Japan .................................. 56-208107
Jul. 20, 1982 [JP] Japan .................................. 57-125063

[51] Int. Cl.$^3$ .............................................. C08F 4/26
[52] U.S. Cl. ...................................... 526/92; 525/246; 525/247; 526/140
[58] Field of Search ................... 526/92, 140; 525/246, 525/247

[56] References Cited

U.S. PATENT DOCUMENTS

| | | | |
|---|---|---|---|
| 3,778,424 | 12/1973 | Sugiura | 526/141 |
| 3,901,868 | 8/1975 | Ueno | 526/141 |
| 4,182,814 | 1/1980 | Bernemann | 526/92 |
| 4,303,769 | 12/1981 | Odar | 526/92 |
| 4,340,685 | 7/1982 | Takeuchi | 525/247 |

*Primary Examiner*—Paul R. Michl
*Attorney, Agent, or Firm*—Burgess, Ryan & Wayne

[57] ABSTRACT

A polybutadiene rubber having an enhanced mechanical strength is produced in such a manner that the contents of water and carbon disulfide in a solution of 1,3-butadiene and carbon disulfide in an inert organic solvent is controlled to 0.2 to 5 m moles and 20 m moles or less, respectively, per liter of the 1,3-butadiene-carbon disulfide solution; a first polymerization mixture is prepared from the controlled 1,3-butadiene-carbon disulfide solution, an organic aluminum compound of the formula Al $R_nX_{3-n}$, wherein R=$C_{1-6}$ alkyl, phenyl, or cycloalkyl, X=halogen, and n=1.5–2.0, and a cobalt compound, for example, by aging a mixture of the controlled 1,3-butadiene-carbon disulfide solution with the aluminum compound for at least one minute and then by admixing the aged mixture with the cobalt compound; the first polymerization mixture is subjected to a cis-1,4-polymerization; a second polymerization comprising the resultant cis-1,4-polybutadiene, non-reacted 1,3-butadiene, the inert organic solvent, an organic aluminum compound of the formula $AlR_3$, a cobalt compound, and the carbon disulfide is subjected to a 1,2-polymerization to produce a polybutadiene rubber consisting essentially of 5% to 30% by weight of a boiling n-hexane-insoluble fraction and 70% to 95% by weight of a boiling n-hexane-soluble fraction thereof; and after the 1,2-polymerization is shortstopped, the resultant polybutadiene rubber is isolated from the 1,2-polymerization mixture.

31 Claims, 2 Drawing Figures

PROCESS FOR PRODUCING POLYBUTADIENE RUBBER WITH ENHANCED MECHANICAL STRENGTH

FIELD OF THE INVENTION

The present invention relates to a process for producing a polybutadiene rubber having an enhanced mechanical strength. More particularly, the present invention relates to a process for producing a polybutadiene rubber comprising 5% to 30% by weight of a fraction insoluble in n-hexane at the boiling temperature thereof and 70% to 95% by weight of a fraction soluble in the boiling n-hexane and having an excellent mechanical strength.

DESCRIPTION OF THE PRIOR ART

Large amounts of cis-1,4-polybutadiene, produced by polymerizing 1,3-butadiene in the presence of a cis-1,4-polymerization catalyst, are used as materials for tires and other rubber products. One of the reasons why large amounts of cis-1,4-polybutadiene are used in the rubber industry is that the rubber products produced therefrom exhibit a high resilience, a low heat builddup property, and superior abrasion resistance and, therefore, are superior to general purpose rubber products. Conventional cis-1,4-polybutadiene rubber products, however, suffer from the disadvantages of poor tear resistance and small cut growth resistance.

In order to eliminate the above-mentioned disadvantages of conventional cis-1,4-polybutadiene rubber products, Japanese Examined Patent Publication (Kokoku) No. 49-17666 discloses a new type of polybutadiene rubber produced by first polymerizing 1,3-butadiene in an inert organic solvent in the presence of a cis-1,4-polymerization catalyst and then second polymerizing 1,3-butadiene in the presence of a 1,2-polymerization catalyst and the resultant cis-1,4-polybutadiene. The publication contains some examples of processes in which polybutadiene rubbers are vulcanized and in which the resultant vulcanized rubber products exhibit excellent tear resistance and cut growth resistance.

The above-mentioned process, however, has several disadvantages which have kept it from being utilized in the polybutadiene rubber industry. That is, in the second polymerization procedure, carbon disulfide is used as a catalytic ingredient of the 1,2-polymerization catalyst. After the first and second polymerization procedures are completed, however, the carbon disulfide cannot easily be separated from the non-reacted 1,3-butadiene and the inert organic solvent, especially, from the non-reacted 1,3-butadiene. Also, carbon disulfide cause some undesirable side reactions when coming into contact with a halogen-containing organic aluminum compound in the absence of water, particularly in the presence of a cobalt compound. Products of such side reactions hinder the polymerization of 1,3-butadiene. Accordingly, it is essential to handle the carbon disulfide very carefully so as to prevent the above-mentioned side reactions.

Under these circumstances, a strong demand exists in the polybutadiene rubber industry for a new process for continuously producing a polybutadiene rubber having enhanced tear resistance and cut growth resistance in addition to excellent impact resilience and abrasion resistance and overcoming the disadvantages incurred with use of carbon disulfide.

SUMMARY OF THE INVENTION

An object of the present invention is to provide a process for producing a polybutadiene rubber having enhanced mechanical strength, for example, excellent tear resistance, cut growth resistance, and abrasion resistance.

Another object of the present invention is to provide a process for producing a polybutadiene rubber wherein the cis-1,4-polymerization of 1,3-butadiene is carried out in an increased catalytic activity of cis-1,4-polymerization catalyst while preventing formation of gel.

Still another object of the present invention is to provide a process for producing a polybutadiene rubber wherein a solution recovered from the resultant polymerization mixture and comprising non-reacted 1,3-butadiene, inert organic solvent, and carbon disulfide can be recycled to the process without separating the carbon disulfide from the recovered solution.

A further object of the present invention is to provide a process for producing a polybutadiene rubber, wherein cis-1,4-polymerization and 1,2-polymerization can be smoothly carried out at high efficiencies and can be continued for a long time period without difficulty.

The above-mentioned objects can be attained by the process of the present invention which comprises the successive steps of:

(A) mixing 1,3-butadiene with an inert organic solvent and carbon disulfide in an amount of 20 millimoles or less per liter of the sum of the amounts of the 1,3-butadiene, and the inert organic solvent to provide a 1,3-butadiene-carbon disulfide solution;

(B) controlling the concentration of water contained in the 1,3-butadiene-carbon disulfide solution to from 0.2 to 5 millimoles per liter of the 1,3-butadiene-carbon disulfide solution;

(C) subjecting a first polymerization mixture, which comprises the controlled 1,3-butadiene-carbon disulfide solution and a cis-1,4-polymerization catalyst comprising:
(a) an aluminum catalytic ingredient consisting of at least one organic aluminum compound of the formula (I):

$$AlR_nX_{3-n} \qquad (I)$$

wherein R represents a member selected from the group consisting of alkyl radicals having 1 to 6 carbon atoms, a phenyl radical, and cycloalkyl radical; X represents a halogen atom, and n represents the number of 1.5 to 2.0; and (b) a cobalt catalytic ingredient consisting of at least one cobalt compound, to a cis-1,4-polymerization to convert at least a portion of the 1,3-butadiene contained in the first polymerization mixture to cis-1,4-polybutadiene;

(D) subjecting a second polymerization mixture, which comprises the resultant cis-1,4-polybutadiene, non-reacted 1,3-butadiene, the organic solvent, and 1,2-polymerization catalyst comprising:
(c) a cobalt catalytic ingredient consisting of at least one cobalt compound,
(d) an aluminum catalytic ingredient consisting of at least one organic aluminum compound of the formula (II):

$$AlR_3 \qquad (II)$$

wherein R is the same as defined above; and
(e) the carbon disulfide,
to 1,2-polymerization to provide a polybutadiene rubber consisting essentially of 5% to 30% by weight of a boiling n-hexane-insoluble fraction and 70% to 95% by weight of a boiling n-hexane-soluble fraction thereof;
(E) stopping the 1,2-polymerization by adding a polymerization shortstopper to the resultant second polymerization mixture; and
(F) isolating the resultant polybutadiene rubber from the stopped second polymerization mixture.

In the process of the present invention, the first polymerization mixture may be prepared by mixing the controlled 1,3-butadiene-carbon disulfide solution of step (B) with the 1,4-polymerization catalyst or may be provided by admixing the controlled 1,3-butadiene-carbon disulfide solution of step (B) with an aluminum catalytic ingredient (a'), consisting of at least one organic aluminum compound of the formula (Ia):

$$AlR_2X \qquad (Ia)$$

wherein R and X are the same as defined above, by aging the resultant admixture for at least one minute and, then, by mixing the aged mixture with the cobalt catalytic ingredient (b).

Also, in the process of the present invention, after the resultant polybutadiene is isolated from the stopped second polymerization mixture, the isolation residue can be processed for recovery of a mixture of the non-reacted 1,3-butadiene, the inert organic solvent and the carbon disulfide and the recovered mixture can be recycled to step (A).

DETAILED EXPLANATION OF THE INVENTION

Figure 1:
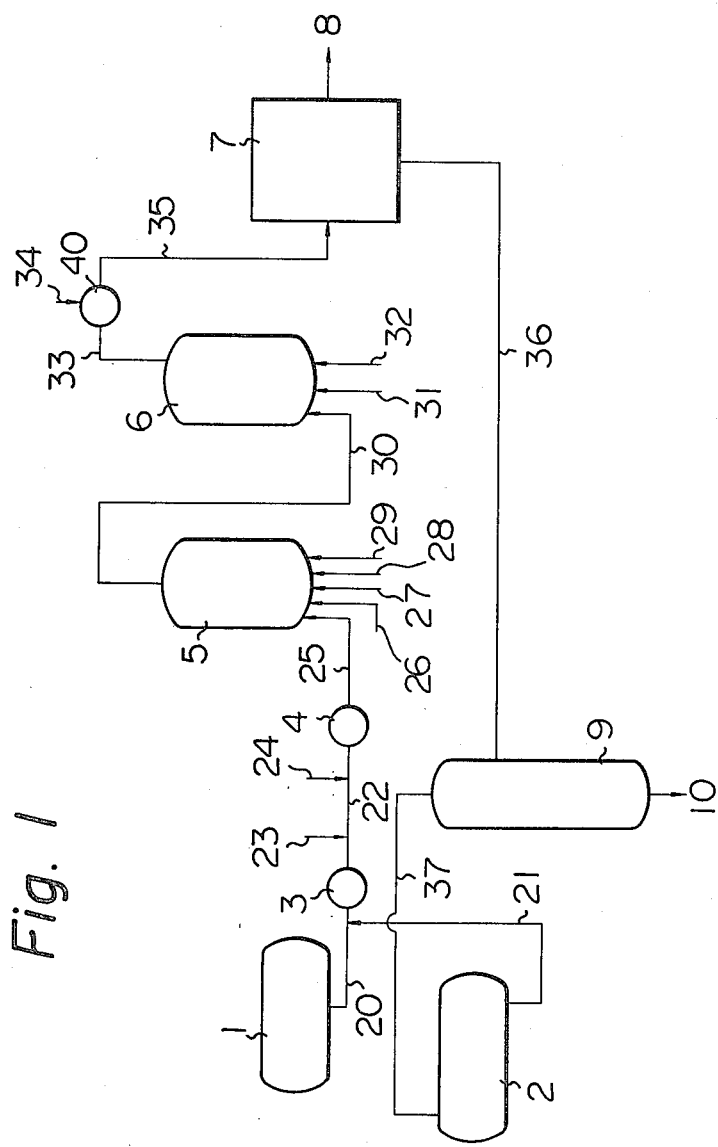
FIG. 1 is a flow sheet of an example of the process of the present invention in which a first polymerization mixture is prepared by directly mixing a controlled 1,3-butadiene-carbon disulfide solution with a cis-1,4-polymerization catalyst and in which an inert organic solvent having a boiling point higher than that of 1,3-butadiene is used.

In step (A) in the process of the present invention, a 1,3-butadiene-carbon disulfide solution is prepared by mixing 1,3-butadiene with an inert organic solvent and carbon disulfide in an amount of 20 millimoles or less, preferably, 0.01 to 10 millimoles, per liter of the sum of the amounts of the 1,3-butadiene and the inert organic solvent. The carbon disulfide is effective as a catalytic ingredient of the 1,2-polymerization catalyst for 1,3-butadiene. The present inventors, however, found that the carbon disulfide does not obstruct the cis-1,4-polymerization of 1,3-butadiene and, therefore, may exist in the above-mentioned amount in the cis-1,4polymerization mixture without affecting the cis-1,4-polymerization of 1,3-butadiene. An amount of carbon disulfide exceeding 20 millimoles per liter of the sum of the amounts of the inert organic solvent and the 1,3-butadiene is not only ineffective for enhancing the catalytic activity of the 1,2-polymerization, but also causes an increase in the side reaction of the carbon disulfide in the final procedure in which the inert organic solvent, non-reacted 1,3-butadiene and the carbon sulfide are recovered. The side reaction of the carbon disulfide produces a bad smell and the resultant polybutadiene rubber is contaminated with the side reaction product.

In this step, it is preferable that the amount of 1,3-butadiene be in the range of from 3% to 40%, based on the sum of the weight of 1,3-butadiene and the inert organic solvent.

The inert organic solvent is not limited to a specific type of liquid compound as long as the solvent is able to dissolve therein the cis-1,4-polybutadiene produced in step (C). Usually, the inert organic solvent consists essentially of at least one member selected from the group consisting of aromatic hydrocarbons, for example, benzene, toluene, and xylene; aliphatic hydrocarbons, for example, n-heptane and n-hexane; cycloaliphatic hydrocarbons, for example, cyclohexane and cyclopentane; and halogenated derivatives of the above-mentioned hydrocarbons, for example, dichloromethane and chlorobenzenes.

In step (B) of the process of the present invention, the concentration of water contained in the 1,3-butadiene-carbon disulfide solution is measured and controlled to a desired value in the range of from 0.2 to 5 millimole, preferably, from 0.5 to 5 millimoles, per liter of the 1,3-butadiene-carbon disulfide solution. The control of the water concentration can be effected by any conventional water-controlling method.

The control of the amount of water to the above-mentioned level is effective for preventing the side reaction between the carbon disulfide and the aluminum catalytic ingredient (a) in the cis-1,4-polymerization step (C).

A concentration of water in the 1,3-butadiene-carbon disulfide solution less than 0.2 millimoles/l or more than 5 millimoles/l will result in an unsatisfactory yield of cis-1,4-polybutadiene in step (C). If it is found that the concentration of water in the 1,3-butadiene-carbon disulfide solution prepared in step (A) is the same as that desired, the 1,3-butadiene-carbon disulfide solution can be directly subjected to step (C). The measurement and control of the water and carbon disulfide concentrations can be carried out by a conventional method. Before the controlled 1,3-butadiene-carbon disulfide solution is subjected to step (C), it is preferable that the solution be cooled to a temperature of 10° C. or less.

In step (C), a first polymerization mixture comprising the controlled 1,3-butadiene-carbon disulfide solution and a cis-1,4-polymerization catalyst is subjected to a first polymerization procedure. The cis-1,4-polymerization catalyst comprises (a) an aluminum catalytic ingredient consisting of at least one organic aluminum compound of the formula (I):

$$AlR_nX_{3-n} \qquad (I)$$

wherein R represents a member selected from the group consisting of alkyl radicals having 1 to 6 carbon atoms, a phenyl radical, and cycloalkyl radical, preferably, having 5 to 7 carbon atoms; X represents a halogen atom, preferably, a chlorine atom; and n represents the number of 1.5 to 2.0 and (b) a cobalt catalytic ingredient consisting of at least one cobalt compound which is soluble in the inert organic solvent used for dissolving 1,3-butadiene therein.

The organic aluminum compound of the formula (I) is preferably selected from the group consisting of diethyl aluminum monochloride, diethyl aluminum monobromide, diisobutyl aluminum monochloride, and ethyl aluminum sesquichloride.

The cobalt compounds usable for the cis-1,4-polymerization catalyst are not limited to a specific type of compound as long as the cobalt compounds are soluble in the inert organic solvent contained in the 1,3-butadiene solution. Preferably, the cobalt compound is selected from the group consisting of cobalt β-ketone complexes, for example, cobalt (II) acetylacetonate and cobalt (III) acetylacetonate; cobalt β-ketoacid ester complexes, for example, cobalt acetacetic ethylester complexes; cobalt salts of organic carboxylic acids having 6 or more carbon atoms, for example, cobalt octoate, cobalt naphthenate, and cobalt benzoate; and cobalt halide complexes, for example, cobalt chloride-pyridine complexes; cobalt chloride-ethyl alcohol complexes and cobalt complexes coordinated with butadiene, for example, (1,3-butadiene) [1-(2-methyl-3-butenyl)-π-allyl]-cobalt which may be prepared, for example, by mixing a cobalt compound with an organic aluminum compound, organic lithium compound or alkyl magnesium compound and 1,3-butadiene.

The first polymerization mixture can be prepared by mixing the controlled 1,3-butadiene-carbon disulfide solution with the cis-1,4-polymerization catalyst. In another method, the first polymerization mixture can be prepared by mixing the controlled 1,3-butadiene-carbon disulfide solution with an aluminum catalytic ingredient (a'), consisting of at least one organic aluminum compound of the formula (Ia):

$$AlR_2X \qquad (Ia)$$

wherein R and X are the same as defined above, by aging the resultant mixture for at least one minute and then by admixing the aged admixture with the cobalt catalytic ingredient (b).

In the above-mentioned first polymerization mixture-preparation method including the aging procedure, it is important that the mixture of the controlled 1,3-butadiene-carbon disulfide solution with the aluminum catalytic ingredient be aged for one minute or more in the absence of the cobalt catalytic ingredient. This aging procedure is effective for enhancing the catalytic activity of the resultant cis-1,4-polymerization catalyst, for restricting formation of a gel in the first polymerization step, and for restricting deposit of polymer (including the gel) onto the inside surface of a vessel in which the cis-1,4-polymerization is carried out. The above-mentioned effects of the aging procedure are also effective for prolonging the lifetime in which the vessel can be continuously used for not only the cis-1,4-polymerization but also the 1,2-polymerization.

The above-mentioned effects of the aging procedure can be further enhanced by preventing contamination of water into the aged mixture after the aging procedure is completed.

If a mixture of the inert organic solvent and the aluminum catalytic ingredient (a') is aged in the absence of 1,3-butadiene or if a mixture of the controlled 1,3-butadiene solution with the cobalt catalytic ingredient (b) is aged, the above-mentioned effects of the aging procedure are extremely small. It is thus impossible to prevent the deposit of the cis-1,4-polybutadiene onto the cis-1,4-polymerization vessel.

The aging procedure of the mixture consisting of the controlled 1,3-butadiene-carbon disulfide solution and the aluminum catalytic ingredient (a') is carried out for at least one minute, preferably, from 2 minutes to 2 hours, preferably, at a temperature of 10° C. to 80° C., more preferably, 10° C. to 50° C. If the aging time is less than one minute, it is difficult to attain the above-mentioned effects of the aging procedure.

After the aging procedure is completed, the aged mixture is preferably cooled to a temperature of 10° C. or less. The resultant cooled mixture is then admixed with the cobalt catalytic ingredient (b) while the admixture is stirred.

It is preferable that the cis-1,4-polymerization catalyst contain the aluminum catalytic ingredient (a) or (a') in an amount of at least 0.1 millimole, more preferably, from 0.5 to 50 millimoles, per mole of 1,3-butadiene in the first polymerization mixture. Also, it is preferable that it contain the cobalt catalytic ingredient (b) in an amount of at least 0.001 millimole, more preferably, at least 0.005 millimole, still more preferably, from 0.007 to 0.07 millimoles, per mole of 1,3-butadiene in the first polymerization mixture. Furthermore, it is preferable that the cis-1,4-polymerization catalyst have a molar ratio of the aluminum catalytic ingredient (a) or (a') to the cobalt catalytic ingredient (b) of at least 5:1, more preferably, at least 15:1, still more preferably, from 50:1 to 500:1.

The resultant first polymerization mixture is subjected to the cis-1,4-polymerization at a temperature of, preferably, from −20° C. to 80° C., more preferably, from 5° C. to 50° C., for a polymerization time, i.e., the average time for which the first polymerization mixture resides in the cis-1,4-polymerization vessel, of from 10 minutes to 10 hours, while the mixture is stirred in the vessel. The polymerization vessel for the cis-1,4-polymerization is not limited to a specific type of vessel. For example, a polymerization vessel with a high viscosity stirring apparatus, for instance, as disclosed in Japanese Examined Patent Publication (Kokoku) No. 40-2645, can be used for carrying out the cis-1,4-polymerization procedure.

In the cis-1,4-polymerization procedure, since both the amounts of water and carbon disulfide in the first polymerization mixture are controlled to specific amounts, the undesirable side reaction between carbon disulfide and the aluminum catalytic ingredient (a) can be prevented, so that the cis-1,4-polymerization of 1,3-butadiene is smoothly carried out.

In the cis-1,4-polymerization procedure, it is preferable that the resultant polybutadiene contain 90% or more, more preferably, 95% or more, of cis-1,4-structure and exhibit an intrinsic viscosity of 1.5 to 8.0, more preferably, 1.5 to 5.0, determined in toluene at a temperature of 30° C.

In order to produce the cis-1,4-polybutadiene having a desired intrinsic viscosity $[\eta]_{toluene}^{30°\ C.}$, the molecular weight of the resultant cis-1,4-polybutadiene can be controlled by adding a molecular weight modifier to the first polymerization mixture. The molecular weight modifier preferably consists essentially of at least one member selected from non-conjugated diene compounds, for example, cyclooctadiene and allene (isoallylene), ethylene, and α-olefin compounds, for instance, propylene and butene-1.

In order to prevent the formation of a gel in the cis-1,4-polymerization, it is preferable that an anti-gelling agent be added to the first polymerization mixture. The anti-gelling agent may be selected from conventional anti-gelling agents.

After the cis-1,4-polymerization procedure is completed, a second polymerization mixture containing the resultant cis-1,4-polybutadiene in step (C) and non-reacted 1,3-butadiene, which are dissolved in the inert organic solvent, and a 1,2-polymerization catalyst is subjected to a 1,2-polymerization. The second polymerization mixture can be prepared by mixing the resultant cis-1,4-polymerization mixture obtained in step (C) and containing therein the carbon disulfide with the aluminum catalytic ingredient (d) and if necessary the cobalt catalytic ingredient (c) of the 1,2-polymerization catalyst and, if necessary, an additional amount of fresh 1,3-butadiene which has been preferably cooled to a temperature of 10° C. or less. In this case, it is preferable that the amount of the non-reacted 1,3-butadiene in the second polymerization mixture be in the range of from 3% to 35% by weight.

The 1,2-polymerization catalyst comprises a cobalt catalytic ingredient (c) consisting of at least one cobalt compound, an aluminum catalytic ingredient (d) consisting of at least one organic aluminum compound of the formula (II):

$$AlR_3 \qquad (II)$$

wherein R is the same as defined above, and another catalytic ingredient (e) consisting of carbon disulfide.

The cobalt compounds usable for the cobalt catalytic ingredient (c) can be selected from the same group of cobalt compounds as those usable for the cobalt catalytic ingredient (b). It is preferable that the cobalt catalytic ingredient (C) consist of at least one cobalt complex coordinated with butadiene.

The aluminum compounds of the formula (II) are preferably selected from the group consisting of triethyl aluminum, trimethyl aluminum, triisobutyl aluminum, and triphenyl aluminum.

The carbon disulfide is preferably free from water.

Each of the catalytic ingredients may be fed, in the form of a solution thereof in the inert organic solvent or in 1,3-butadiene, to the second polymerization mixture. The solution is preferably cooled to a temperature of 10° C. or less.

In the second polymerization mixture, the amount of the 1,2-polymerization catalyst is variable depending on the types of the catalytic ingredients, component of the catalyst, and the polymerization conditions. However, it is preferable that the cobalt catalytic ingredient (c) be used in an amount of 0.005 millimole or more, preferably, from 0.01 to 5 millimoles; the aluminum catalytic ingredient (d) in an amount of at least 0.1 millimole, preferably, from 0.5 to 50 millimoles; and carbon disulfide (e) in an amount of at least 0.001 millimole, more preferably, from 0.01 to 10 millimoles, each per mole of 1,3-butadiene in the second polymerization mixture.

In the case where the type of the cobalt catalytic ingredient (b) in the cis-1,4-polymerization catalyst is the same as that of the cobalt catalytic ingredient (c) in the 1,2-polymerization catalyst, the cis-1,4-polymerization catalyst may contain the cobalt compound in an amount necessary for both the cis-1,4- and 1,2-polymerization procedures. In this case, the second polymerization mixture can be prepared by mixing the resultant first polymerization mixture which contains the cobalt catalytic ingredient, in the necessary amount for the 1,2-polymerization catalyst, with the aluminum catalytic ingredient and, if necessary, carbon disulfide.

In the case where the amount of the carbon disulfide necessary for the 1,2-polymerization is larger than that contained in the 1,3-butadiene-carbon disulfide solution, a necessary additional amount of carbon disulfide should be added to the polymerization mixture in a certain step, for example, step (B), before step (D).

The second polymerization mixture is subjected to the 1,2-polymerization procedure preferably at a temperature of from −20° C. to 80° C., more preferably, from 5° C. to 50° C. for 10 minutes to 10 hours, under either atmospheric pressure or increased pressure for, for example, 10 minutes to 10 hours.

The 1,2-polymerization procedure is carried out by stirring the second polymerization mixture in a polymerization vessel. Since the second polymerization mixture exhibits a high viscosity during the 1,2-polymerization procedure, the resultant polymer tends to deposit onto the surface of the polymerization vessel. Therefore, it is preferable that the polymerization vessel be provided with a device for removing the deposited polymer, as described in Japanese Examined Patent Publication No. 40-2645.

After the 1,2-polymerization procedure is completed, it is preferable that the resultant 1,2-polymerization mixture which contains the resultant polybutadiene rubber, non-reacted 1,3-butadiene, carbon disulfide, cobalt catalytic ingredient(s), aluminum catalytic ingredients, and inert organic solvent be moved to a polymerization shortstopping vessel and that a polymerization shortstopper be added to the 1,2-polymerization mixture so as to shortstop the 1,2-polymerization.

The polymerization shortstopper is not limited to a specific type of compounds as long as the compounds can be reacted with the aluminum compounds of the formula (II) so as to deactivate the aluminum catalytic ingredient (d). Usually, the polymerization shortstopper consists of at least one member selected from aliphatic alcohols, for example, methyl alcohol and ethyl alcohol; water; inorganic acids, for example, hydrochloric acid and sulfuric acid; organic acids, for instance, acetic acid and benzoic acid; monoethanolamine; ammonia; phosphorous esters, for example, tris(nonylphenyl)phosphite, and hydrogen chloride gas. The polymerization shortstopper may be in the form of an aqueous solution or an alcoholic solution.

After the 1,2-polymerization procedure is terminated, the resultant 1,2-polymerization mixture is subjected to a step for isolating the resultant polybutadiene rubber therefrom. This solution can be effected by adding a precipitating agent, for example, methyl alcohol to the polymerization mixture or by evaporating volatile substances from the polymerization mixture while blowing or not blowing steam into the polymerization mixture, so as to cause the polybutadiene rubber to precipitate from the polymerization mixture. The precipitated polybutadiene rubber is separated from the polymerization mixture, washed with methyl alcohol or hot water, and then dried.

In order to protect the polybutadiene rubber from degradation, it is preferable that an anti-oxidant be added to the resultant polymerization mixture during the shortstopping procedure, or be added to the isolated slurry of the polybutadiene rubber.

In the 1,2-polymerization procedure, a polybutadiene rubber consisting essentially of 5% to 30%, preferably, 7% to 15% by weight of a boiling n-hexane-insoluble fraction and 70% to 95%, preferably, 85% to 93% by weight of a boiling n-hexane-soluble fraction thereof is obtained. The boiling n-hexane-insoluble fraction usually exhibits a melting point of from 180° C. to 215° C.

After the polybutadiene rubber is isolated from the polymerization mixture, the isolation residue is subjected to a recovery procedure in which the non-reacted 1,3-butadiene, inert organic solvent, and carbon disulfide are recovered, usually, by means of distillation.

In the recovery procedure, a mixture of the non-reacted 1,3-butadiene, the inert organic solvent and the carbon disulfide are recovered as a distillate. The resultant distilled mixture can be recycled to the first step (A).

In the case where the inert organic solvent used has a significantly higher boiling point than that of the carbon disulfide, it is preferable that the distillation procedure be carried out in two steps. In this case, a mixture of the non-reacted 1,3-butadiene and almost all of the amount of the carbon disulfide is distilled at a low temperature in a first distillation column and, then, a mixture of the inert organic solvent and, occasionally, the remaining amount of the carbon disulfide is obtained at a high temperature in a second distillation column. Otherwise, the distillation procedure may be carried out in a single step so as to obtain a mixture of the non-reacted 1,3-butadiene, inert organic solvent, and carbon disulfide.

In the case where the boiling point of the inert organic solvent used is closed to that of the carbon disulfide, for example, the inert organic solvent consists of methylene chloride, the distillation procedure may be carried out in such a manner that a mixture of the non-reacted 1,3-butadiene and the minor amount of the carbon disulfide is distilled in a first distillation column and, then, a mixture of the inert organic solvent and the major amount of the carbon disulfide is obtained in a second distillation column. Of course, the distillation can be carried out in a single step so as to obtain a mixture of the non-reacted 1,3-butadiene, inert organic solvent, and carbon disulfide.

The recovered mixture of the non-reacted 1,3-butadiene, inert organic solvent, and carbon disulfide is recycled to the first step (A) and, if necessary, is mixed with necessary amounts of fresh 1,3-butadiene and carbon disulfide to provide a 1,3-butadiene-carbon disulfide solution having a predetermined composition.

In the process of the present invention, it is essential that the recovered mixture can be directly recycled to the step (A) without separating the carbon disulfide from the other components, the non-reacted 1,3-butadiene, and the inert organic solvent.

The process of the present invention will be further explained by referring to the accompanying drawings.

In FIG. 1, fresh 1,3-butadiene contained in a tank 1 is introduced into a mixer 3 through a conduit 20 and a recovered solution of 1,3-butadiene and carbon disulfide in an inert organic solvent having a higher boiling point than that of 1,3-butadiene, for example, benzene, from a tank 2 into the mixer 3 through a conduit 21. The fresh 1,3-butadiene and the recovered 1,3-butadiene-carbon disulfide solution are mixed with each other in the mixer 3 to provide a 1,3-butadiene-carbon disulfide solution having a desired concentration of 1,3-butadiene. The 1,3-butadiene-carbon disulfide solution is introduced from the mixer 3 into a mixer 4 through a conduit 22. In order to control the concentration of water in the 1,3-butadiene solution to a desired value, water is fed into the conduit 22 through a water-supply conduit 23. Occasionally, an additional amount of fresh carbon disulfide is introduced into the conduit 22 through a carbon disulfide-supply conduit 24. The carbon disulfide-supply conduit 24 may be connected at the upstream to the water-supply conduit 23, to the conduit 22. The 1,3-butadiene-carbon disulfide solution is uniformly mixed with water and, occasionally, with the fresh carbon disulfide in the mixer 4. The resultant controlled 1,3-butadiene-carbon disulfide solution is supplied into a cis-1,4-polymerization vessel 5 through a conduit 25. An aluminum catalytic ingredient and a cobalt catalytic ingredient are fed into the vessel 5 through a conduit 26 and a conduit 29, respectively. Also, a molecular weight modifier consisting of, for example, cyclooctadiene and an anti-gelling agent consisting of, for example, dilauryl-3,3'-thiodipropionate are fed into the vessel 5 through a conduit 27 and a conduit 28, respectively. The resultant first polymerization mixture is stirred in the vessel 5 to produce a cis-1,4-polybutadiene. The resultant polymerization mixture containing cis-1,4-polybutadiene is transferred from the vessel 5 to a 1,2-polymerization vessel 6 through a conduit 30. A cobalt catalytic ingredient is supplied to the vessel 6 through a conduit 31, an aluminum catalytic ingredient consisting of the aluminum compound of the formula (II) is fed into the vessel 6 through a conduit 32. The aluminum catalytic ingredient and/or carbon disulfide may be fed into the conduit 30. The resultant second polymerization mixture in the vessel 6 is stirred so as to allow the cis-1,4-polybutadiene and the non-reacted 1,3-butadiene to be converted to a polybutadiene rubber consisting essentially of 5% to 30% by weight of a boiling n-hexane-insoluble fraction and 70% to 95% by weight of a boiling n-hexane-soluble fraction. During the 1,2-polymerization procedure, a polymer insoluble in the inert organic solvent deposits from the polymerization mixture onto the inside surface of the vessel 6 and the viscosity of the polymerization increases. Therefore, it is preferable that the 1,2-polymerization vessel 6 have an agitator equipped with a device for removing the deposited polymer from the inside surface of the vessel.

The resultant polymerization mixture in the 1,2-polymerization vessel 6 is introduced into a polymerization shortstopping vessel 40 through a conduit 33. Also, a polymerization shortstopper is fed into the vessel 40 through a conduit 34 so as to shortstop the 1,2-polymerization. The polymerization shortstopped mixture is introduced into an isolating apparatus 7 through a conduit 35. In the insulating apparatus 7, the resultant polybutadiene rubber is isolated so as to leave an isolation residue containing non-reacted 1,3-butadiene, inert organic solvent, and carbon disulfide. The isolating apparatus 7 may be a conventional apparatus and may be equipped with a steam stripper and a filter. The isolated polybutadiene rubber is removed through a passage 8. The isolation residue containing the non-reacted 1,3-butadiene, inert organic solvent and carbon disulfide is introduced into a distillation apparatus 9 through a conduit 36. The distillation apparatus may be composed of a single distillation column or two or more distillation columns.

In the distillation apparatus 9, a mixture of the non-reacted 1,3-butadiene, the inert organic solvent, and carbon disulfide is recovered and is introduced into the tank 2 through a conduit 37. A distillation residue containing a high boiling point substance is removed from the distillation apparatus 9 through a passage 10.

Figure 2:
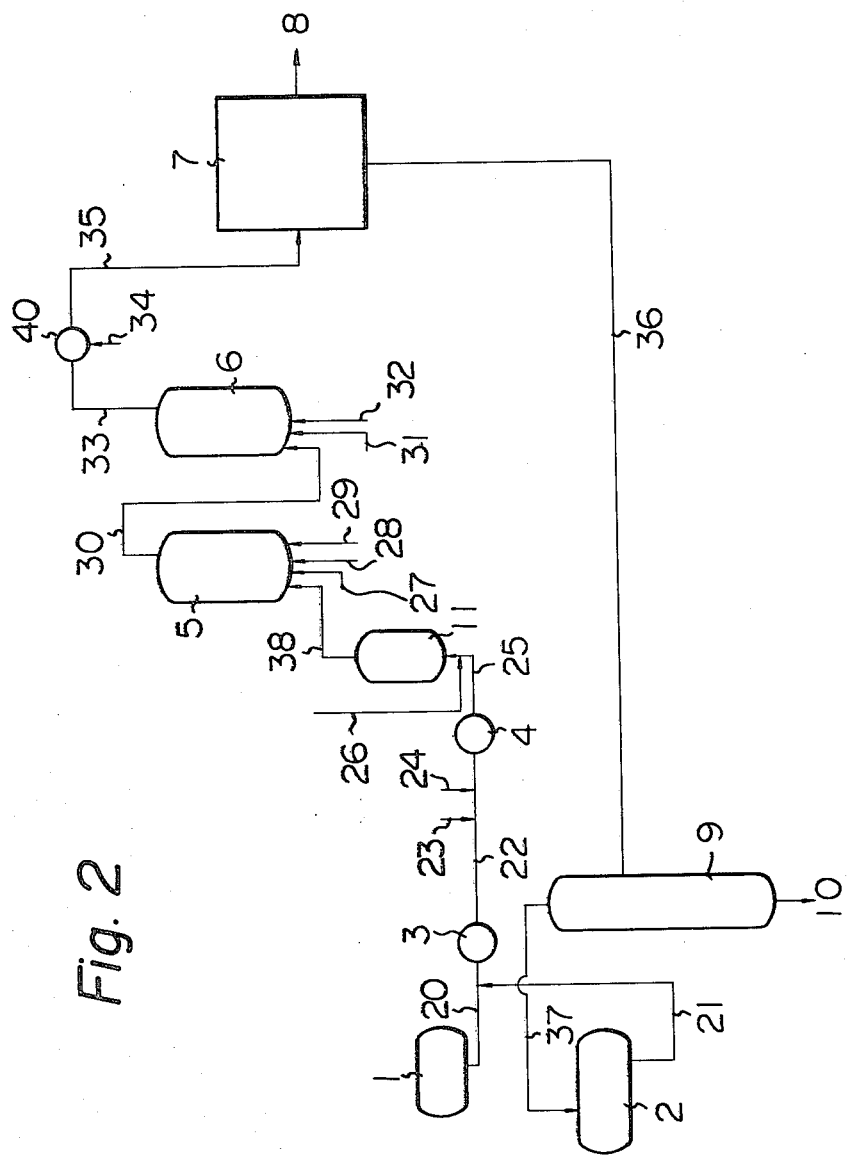
FIG. 2 is a flow sheet of another example of the process of the present invention in which an inert organic solvent having a boiling point higher than that of 1,3-butadiene is used and in which a first polymerization mixture is prepared by aging a mixture of a controlled-1,3-butadiene-carbon disulfide solution with an aluminum catalytic ingredient and then by mixing the aged mixture with a cobalt catalytic ingredient.

Referring to FIG. 2, the apparatus is composed of the same devices as those indicated in FIG. 1, with the following exceptions. That is, an aging vessel 11 is inserted between the mixer 4 and the cis-1,4-polymerization vessel 5. The mixer 4 is connected to the aging vessel 11 through the conduit 25 and a conduit 26 for feeding an aluminum catalytic ingredient of the cis-1,4-polymerization catalyst is connected to the conduit 25. The aging vessel 11 is connected to the cis-1,4-polymerization vessel 5 through a conduit 38.

The controlled 1,3-butadiene-carbon disulfide solution is mixed with the aluminum catalytic ingredient in the conduit 25 or in the vessel 11 and the resultant mixture is aged in the aging vessel 11 for a predetermined time period. The aged mixture is fed into the cis-1,4-polymerization vessel 5 through the conduit 38 and is mixed in the vessel 5 with a molecular weight modifier fed through the conduit 27, an anti-gelling agent fed through the conduit 28, and a cobalt catalytic ingredient fed through the conduit 29.

The above-mentioned aging procedure is effective for reducing the amount of the cobalt catalytic ingredient necessary for obtaining the cis-1,4-polymerization catalyst having a satisfactory catalytic activity.

SPECIFIC EXAMPLES

The present invention will be further explained in the following examples. In the example, the amount of the boiling n-hexane-insoluble fraction of the resultant polybutadiene rubber was determined by immersing 2 g of the polybutadiene rubber in 200 ml of n-hexane at room temperature, by separating a fraction of the rubber insoluble in n-hexane by means of filtration, by extracting the n-hexane-insoluble fraction at a boiling point of n-hexane by using a Soxhlet's extractor for 4 hours, by separating the non-extracted fraction from n-hexane, by drying it under vacuum, and, finally, measuring the weight of the dried fraction.

The amount of the boiling n-hexane-soluble fraction of the polybutadiene rubber was determined by subjecting the resultant extracted solution from the above-mentioned extraction procedure to an evaporation procedure in which n-hexane was evaporated under the solution, drying the residual fraction under vacuum, then measuring the weight of the dried fraction.

The content of the cis-1,4-structure in the boiling n-hexane-soluble fraction in the polybutadiene rubber and the content of the cis-1,4-structure in the cis-1,4-polymerization product were determined by means of infrared absorption spectrum analysis (IR).

The content of the 1,2-structure in the boiling n-hexane-insoluble fraction of the polybutadiene rubber was determined by means of nuclear magnetic resonance spectrum (NMR).

The melting point of the boiling n-hexane-insoluble fraction of the polybutadiene rubber was determined from a temperature at a peak point appearing in an endothermic curve of the boiling n-hexane-insoluble fraction measured by a recording differential scanning calorimeter (DSC).

The intrinsic viscosities $[\eta]$ of the boiling n-hexane-soluble fraction of the polybutadiene rubber and of the cis-1,4-polymerization product were determined in toluene at a temperature of 30° C.

The reduced viscosity $[\eta_{SP}/C]$ of the boiling n-hexane-insoluble fraction of the polybutadiene rubber was determined in tetrahydronaphthalene at a temperature of 135° C.

The concentration of carbon disulfide in a carbon disulfide-containing liquid was determined by using a gas chromatograph equipped with a flame spectrophotometer and containing therein a filler consisting of chromosolve 102 (trademark, made by Gasukuro Kogyo Co., Ltd.).

EXAMPLE 1

A solution containing 23.7% by weight of 1,3-butadiene and 10 mg/l of carbon disulfide dissolved in benzene was dehydrated by using a dehydrating column. The dehydrated 1,3-butadiene solution was mixed with 40 mg/l (2.2 millmoles/l) of water and the mixture was stirred so as to allow water to be dissolved in the 1,3-butadiene solution. The resultant controlled solution was cooled to a temperature of $-3°$ C., then was continuously introduced at a flow rate of 50 l/hr into a cis-1,4-polymerization vessel. The vessel was a stainless steel autoclave having an inside volume of 20 liters and equipped with double helical type stirring paddles and a jacket tube for controlling the temperature of the content in the autoclave. An aqueous solution of calcium chloride ($CaCl_2$) was circulated through the jacket tube at a temperature of $-10°$ C.

Also, into the cis-1,4-polymerization vessel, diethylaluminum monochloride was introduced at a flow rate of 25.5 g/hr, 1,5-cyclooctadiene at a flow rate of 60.0 g/hr, dilauryl-3,3'-thiodipropionate (TPL) at a flow rate of 7.0 g/hr, and cobalt octoate at a flow rate of 253 mg/hr. The resultant first polymerization mixture was stirred at a temperature of 40° C. for an average residing time of 24 minutes to cis-1,4-polymerize the 1,3-butadiene. During the cis-1,4-polymerization procedure, cis-1,4-polybutadiene was produced at a rate of 3.20 kg/hr. The resultant polymer contained 96% or more of cis-1,4-structure and had an intrinsic viscosity of 1.7. The content of gel produced in the polymer was 0.02% by weight, determined by using a 200 mesh screan. The resultant polymerization mixture in the cis-1,4-polymerization vessel was introduced at a flow rate of 50 liters/hr into a 1,2-polymerization vessel of the same type as the cis-1,4-polymerization vessel. Also, the 1,2-polymerization vessel was charged with triethylaluminum at a flow rate of 27.0 g/hr, and cobalt octoate at a flow rate of 840 mg/hr. The resultant second polymerization mixture was stirred at a temperature of 40° C. for an average residing time of 24 minutes so as to 1,2-polymerize the non-reacted 1,3-butadiene. The resultant polymerization mixture was continuously introduced into a polymerization shortstopping vessel equipped with stirring paddles and was mixed with 1 PHR of 2,6-di-tert-butyl-methylphenol and then with a small amount of methyl alcohol so as to shortstop the 1,2-polymerization reaction. The resultant mixture was introduced at a flow rate of 120 liters/hr into a steam stripper equipped with stirring paddles and was mixed with hot water and saturated steam introduced into the stripper under a pressure of 4 kg/cm² G. The mixture was dispersed in the hot water so as to allow the volatile substances in the mixture to evaporate away. The resultant aqueous slurry of the polybutadiene rubber was removed from the steam stripper. The polybutadiene rubber in the form of crumbs and water were separated using a roll mill, and vulcanized at a temperature of 140° C. for 30 minutes. The vulcanizing procedure was applied to a portion of the composition which was subjected to the measurement of a cut growth resistance of the vulcanized rubber, at 140° C. for 75 minutes. The properties of the vulcanized rubber were determined in accordance with Japanese Industrial Standard K-6301.

In Example 4, the same procedures as those described in Example 3 were carried out except that the polybutadiene rubber used was one produced in Example 2.

For the purpose of comparison, the same procedures as those mentioned above were carried out, except that the polybutadiene rubber was replaced by a commercially available high cis-1,4-polybutadiene.

The properties of the vulcanized rubber of the present example and the comparative vulcanized rubber are indicated in Table 2.

TABLE 2

| Item | Example 3 | Example 4 | Comparative Composition |
|---|---|---|---|
| Hardness | 71 | 71 | 60 |
| 300% modulus (kg/cm$^2$) | 146 | 149 | 83 |
| Ultimate elongation (%) | 182 | 188 | 190 |
| Tensile strength (kg/cm$^2$) | 400 | 400 | 540 |
| Tear resistance (kg/cm$^2$)(*)$_1$ | 60 | 62 | 48 |
| Resilience (%) | 50 | 51 | 64 |
| Cut growth resistance (*)$_2$ | 75,000 | 72,000 | 3,000 |

Note:
(*)$_1$The tear resistance was measured by using B-type dumbbell described in JIS K-6301.
(*)$_2$The cut growth resistance was measured by the De Mattia flex machine and was represented by the number of flexing operations at which the length of a crack in a testing specimen reached from 2 mm to 15 mm.

EFFECTS OF THE INVENTION

In the process of the present invention, since the amounts of water and carbon disulfide in the first polymerization mixture are controlled to the specific amounts, the undesirable side reaction of carbon disulfide and the undesirable formation of gel in the cis-1,4-polymerization can be restricted.

Furthermore, since the distribution of carbon disulfide in the 1,2-polymerization mixture is even, the 1,2-polymerization reaction can be carried out smoothly and uniformly. Therefore, the 1,2-polymerization can be continued for a long time period without difficultly.

Still furthermore, after the resultant polybutadiene rubber is isolated from the polymerization mixture, a mixture of the non-reacted 1,3-butadiene, inert organic solvent, and carbon disulfide is easily separated from the isolation residue and can be replaced to the first step without removing carbon disulfide therefrom. Accordingly, no apparatus for removing carbon disulfide is necessary.

We claim:

1. A process for producing a polybutadiene rubber with enhanced mechanical strength, comprising the successive steps of:
   (A) mixing 1,3-butadiene with an inert organic solvent and carbon disulfide in an amount of 20 millimoles or less per liter of the sum of the amounts of said 1,3-butadiene and said inert organic solvent to provide a 1,3-butadiene-carbon disulfide solution;
   (B) controlling a concentration of water contained in said 1,3-butadiene-carbon disulfide solution to from 0.2 to 5 millimoles per liter of said 1,3-butadiene-carbon disulfide solution;
   (C) subjecting a first polymerization mixture which comprises said controlled 1,3-butadiene-carbon disulfide solution and a cis-1,4polymerization catalyst consisting essentially of:
      (a) an aluminum catalytic ingredient consisting of at least one organic aluminum compound of the formula (I):

$$AlR_nX_{3-n} \qquad (I)$$

wherein R represents a member selected from the group consisting of alkyl radicals having 1 to 6 carbon atoms, a phenyl radical and cycloalkyl radicals, X represents a halogen atom and n represents the number of 1.5 to 2.0, and
      (b) a cobalt catalytic ingredient consisting of at least one cobalt compound,
   to a cis-1,4-polymerization to convert at least a portion of said 1,3-butadiene contained in said first polymerization mixture to cis-1,4-polybutadiene;
   (D) subjecting a second polymerization mixture which comprises the resultant cis-1,4-polybutadiene, non-reacted 1,3-butadiene, said organic solvent, and an 1,2-polymerization catalyst consisting essentially of:
      (c) a cobalt catalytic ingredient consisting of at least one cobalt compound,
      (d) an aluminum catalytic ingredient consisting of at least one organic aluminum compound of the formula (II):

$$AlR_3 \qquad (II)$$

wherein R is the same as defined above, and
      (e) said carbon disulfide, to a 1,2-polymerization to provide a polybutadiene rubber consisting essentially of 5% to 30% by weight of a boiling n-hexane-insoluble fraction and 70% to 95% by weight of a boiling n-hexane-soluble fraction thereof:
   (E) stopping said 1,2-polymerization by adding a polymerization shortstopper to the resultant second polymerization mixture; and
   (F) isolating the resultant polybutadiene rubber from the stopped second polymerization mixture.

2. The process as claimed in claim 1, wherein the amount of 1,3-butadiene in said 1,3-butadiene-carbon disulfide solution in step (A) is in the range of from 3% to 40% based on the sum of the weights of 1,3-butadiene and said inert organic solvent.

3. The process as claimed in claim 1, wherein said inert organic solvent consists essentially of at least one member selected from the group consisting of aromatic hydrocarbons, aliphatic hydrocarbons, cycloaliphatic hydrocarbons, and halogenated derivatives of the above-mentioned hydrocarbons.

4. The process as claimed in claim 1, wherein in step (B), the amount of water in said 1,3-butadiene-carbon dislufide solution is controlled to a range of from 0.5 to 5 millimoles per liter of said 1,3-butadiene solution.

5. The process as claimed in claim 1, wherein said first polymerization mixture is prepared by mixing the controlled 1,3-butadiene-carbon disulfide solution with said cis-1,4-polymerization catalyst.

6. The process as claimed in claim 1, wherein said controlled 1,3-butadiene-carbon disulfide solution is cooled to a temperature of 10° C. or less.

7. The process as claimed in claim 1, wherein said aluminum compound of the formula (I) in said cis-1,4- from the aqueous slurry. The separated polybutadiene rubber was dried at room temperature under vacuum.

The above-mentioned procedures were continuously carried out for 14 hours. The polybutadiene rubber was produced at a rate of 3.60 kg/hr. The polybutadiene rubber contained 11.3% of a boiling n-hexane-insoluble fraction having a melting point of 206° C. and a reduced viscosity ($\eta_{sp}$/C) of 2.0 (dl/g) and containing 93.0% of 1,2-structure. The remaining boiling n-hexane soluble fraction of the polybutadiene rubber contained 97.1% of cis-1,4-structure and had an intrinsic viscosity of 1.7.

After the polymerization procedures were completed, a fresh 1,3-butadiene solution was passed through the polymerization apparatus at a flow rate of 50 liters/hr for 30 minutes. Thereafter, the polymer adhering on the inside surface of the polymerization vessels and on the surfaces of the stirring paddles was collected. The collected polymer was dried under vacuum. The amount of the polymer collected in the cis-1,4-polymerization vessel was 18 g containing 8 g of gel. The amount of the polymer collected in the 1,2-polymerization vessel was 95 g.

The volatile substance evaporated from the steam stripper was cooled and was condensed. The condensed liquid was separated into an aqueous phase and a organic solvent phase. The organic solvent phase was isolated from the aqueous phase. A portion of the isolated organic solvent solution was subjected to a recovery process of carbon disulfide, 1,3-butadiene, and benzene in the following manner.

The isolated organic solvent solution, which contained 16.1% by weight of 1,3-butadiene and 12 mg/l of carbon disulfide and was in an amount of 500 liters, was distilled so as to eliminate high boiling point substances from the solution. The distillation product containing a mixture of the non-reacted 1,3-butadiene, inert organic solvent, and carbon disulfide was recycled to the first step, without removing the carbon disulfide therefrom.

EXAMPLE 2

The same procedures as those described in Example 1 were carried out with the following exceptions.

In the controlled 1,3-butadiene-carbon disulfide solution, the concentration of water was adjusted to 38 mg (2.1 millimoles)/l. The resultant controlled solution was introduced at a flow rate oof 50 liters/hr into an aging vessel equipped with stirring paddles and having an inside volume of 20 liters while diethylaluminum monochloride was introduced at a flow rate of 25.1 g (209 millimoles)/hr into the aging vessel. The resultant mixture was aged in the aging vessel at a temperature of 35° C. for an average residing time of 25 minutes. The aged mixture was cooled to a temperature of −4° C. and then introduced at a flow rate of 50 liters/hr into the same type of cis-1,4-polymerization vessel as that described in Example 1, while introducing, into the cis-1,4-polymerization vessel, cobalt octoate at a flow rate of 265 mg (0.77 millimoles)/hr, 1,5-cyclooctadiene at a flow rate of 60.5 g (0.561 moles)/hr, and dilauryl-3,3'-thiodipropionate (TPL) at a flow rate of 6.98 g (13.4 millimoles)/hr, to provide the first polymerization mixture.

By the cis-1,4-polymerization procedure at a polymerization temperature of 40° C. for an average residing time of 25 minutes, cis-1,4-polybutadiene was produced at a rate of 3.60 kg/hr. The resultant polymer contained 96% or more of cis-1,4-structure and had an intrinsic viscosity of 2.0 and a content of gel of 0.01% or less which was determined by using a 200 mesh screen.

The resultant polymerization mixture was introduced at a flow rate of 50 liters/hr into the same type of 1,2-polymerization vessel as that described in Example 1, while introducing, into the 1,2-polymerization vessel, triethylaluminum at a flow rate of 27.2 g (239 millimoles)/hr and cobalt octoate at a flow rate of 838 mg (2.36 millimoles)/hr. The resultant second polymerization mixture was subjected to the 1,2-polymerization under the same conditions as those described in Example 1.

The 1,2-polymerization reaction was shortstopped by introducing the polymerization mixture into the same type of polymerization shortstopping vessel as that described in Example 1 and by mixing it with tris(nonylphenyl)phosphite (TNP) in an amount of 2 moles per mole of the cobalt octoate and with a small amount of water.

The procedures for producing the polybutadiene rubber were continuously carried out for 22 hours. The polybutadiene rubber was obtained in an amount of 4,09 kg/hr and contained 12.0% by weight of the boiling n-hexane-insoluble fraction thereof. The boiling n-hexane-isoluble fraction exhibited a melting point of 206° C. and a reduced viscosity [$\eta_{sp}$/C] of 2.0 (dl/g) and contained 92.9% of 1,2-structure. The remaining boiling n-hexane-soluble fraction of the resultant polybutadiene rubber contained 97.0% of cis-1,4-structure and had an intrinsic viscosity [$\eta$] of 2.1.

After the cis-1,4-polymerization vessel and the 1,2-polymerization vessel were washed with the fresh 1,3-butadiene solution in the same manner as that described in Example 1, it was found that the polymer removed from the cis-1,4-polymerization vessel was in an amount of 13 g including 2 g of gel and the polymer removed from the 1,2-polymerization vessel was in an amount of 90 g.

The non-reacted 1,3-butadiene, the inert organic solvent (benzene), and carbon disulfide were recovered by the following manner.

The organic solvent solution was isolated from the residue of the resultant polymerization mixture in the same manner as that described in Example 1. The isolated solution contained 15.5% by weight of 1,3-butadiene and 12 mg/l of carbon disulfide.

An 800 liter amount of the isolated organic solvent solution was subjected to the same recovery procedures as that described in Example 1.

EXAMPLES 3 AND 4

In Example 3, the polybutadiene rubber produced in Example 1 was converted into a composition as indicated in Table 1.

TABLE 1

| Component | Amount (part by weight) |
|---|---|
| Polybutadiene rubber | 100 |
| HAF Carbon black(*) | 50 |
| Aromatic process oil | 10 |
| Zinc oxide | 5 |
| Stearic acid | 2 |
| Amine type antioxidant | 1 |
| Cyclohexyl-benzothiazyl sulfenamide | 1 |
| Sulfur | 1.5 |

Note:
Oil adsorption: 120 ml per 100 g of the carbon black.
Surface area: 85 m$^2$ per g of the carbon black.

The composition was uniformly mixed by using a Bambury mixer having a capacity of 1.7 l and, then, by polymerization catalyst is selected from the group consisting of diethyl aluminum monochloride, diethyl aluminum monobromide, diisobutyl aluminum monochloride, and ethyl aluminum sesquichloride.

8. The process as claimed in claim 1, wherein said cobalt compound in said cis-1,4-polymerization catalyst is selected from the group consisting of cobalt β-ketone complexes, cobalt β-ketoacid estel complexes, cobalt salts of organic carboxylic acids having 6 or more carbon atoms, cobalt halide complexes and cobalt complexes coordinated with butadiene.

9. The process as claimed in claim 1, wherein the amount of said aluminum catalytic ingredient (a) in said cis-1,4-polymerization catalyst is at least 0.1 millimole per mole of 1,3-butadiene in said first polymerization mixture.

10. The process as claimed in claim 1, wherein the amount of said cobalt catalytic ingredient (b) in said cis-1,4-polymerization catalyst is at least 0.001 millimole per mole of 1,3-butadiene in said first polymerization mixture.

11. The process as claimed in claim 1, wherein the molar ratio of said aluminum catalytic ingredient (a) to said cobalt ingredient (b) in said cis-1,4-polymerization catalyst is at least 5.0.

12. The process as claimed in claim 1, wherein said first polymerization mixture is prepared by mixing the controlled 1,3-butadiene-carbon disulfide solution of step (B) with an aluminum catalytic ingredient (a′) consisting of at least one organic aluminum compound of the formula (Ia):

$$AlR_2X \qquad (Ia)$$

wherein R and X are the same as defined above, by aging the reslultant mixture for at least one minute, and, then, by admixing said aged mixture with said cobalt catalytic ingredient (b).

13. The process as claimed in claim 12, wherein said aging operation is carried out at a temperature of from 10° C. to 80° C.

14. The process as claimed in claim 12, wherein said organic aluminum compound of the formula (Ia) is selected from the group consisting of diethyl aluminum monochloride, diethyl aluminum monobromide, and diisobutyl aluminum monochloride.

15. The process as claimed in claim 1, wherein said cis-1,4-polymerization is carried out at a temperature of from −20° C. to 80° C.

16. The process as claimed in claim 1, wherein the resultant cis-1,4-polybutadiene in step (C) contains at least 90% of cis-1,4-structure and has an intrinsic viscosity of from 1.5 to 8 determined in toluene at a temperature of 30° C.

17. The process as claimed in claim 1, wherein said first polymerization mixture further contains a molecular weight modifier and/or an anti-gelling agent.

18. The process as claimed in claim 1, wherein said aluminum compound of the formula (II) in said 1,2-polymerization catalyst is selected from the group consisting of triethyl aluminum, trimethyl aluminum, triisobutyl aluminum, and triphenyl aluminum.

19. The process as claimed in claim 1, wherein said cobalt compound in said 1,2-polymerization catalyst is selected from the group consisting of cobalt β-ketone complexes, cobalt β-ketoacid ester complexes, cobalt salts of organic carboxylic acids having 6 or more carbon atoms, cobalt halide complexes and cobalt complexes coordinated with butadiene.

20. The process as claimed in claim 1, wherein said aluminum catalytic ingredient (d) in said 1,2-polymerization catalyst is in an amount of at least 0.1 millimole per mole of said non-reacted 1,3-butadiene in said second polymerization mixture.

21. The process as claimed in claim 1, wherein said cobalt catalytic ingredient (c) in said 1,2-polymerization catalyst is in an amount of at least 0.005 millimole per mole of said non-reacted 1,3-butadiene in said second polymerization mixture.

22. The process as claimed in claim 1, wherein said carbon disulfide in said second polymerization mixture is in an amount of at least 0.001 millimole per mole of said non-reacted 1,3-butadiene in said second polymerization mixture.

23. The process as claimed in claim 1, wherein said 1,2-polymerization is carried out at a temperature of from −20° C. to 80° C.

24. The process as claimed in claim 1, wherein said second polymerization mixture contains said non-reacted 1,3-butadiene in a concentration of from 3% to 35% by weight.

25. The process as claimed in claim 1, wherein said polymerization shortstopper consists of at least one member selected from the group consisting of aliphatic alcohols, water, inorganic acids, organic acids, monoethanolamine, ammonia, phosphorous esters and hydrogen chloride.

26. The process as claimed in claim 25, wherein said shortstopper is in the form of a solution thereof dissolved in water and/or aliphatic liquid alcohols.

27. The process as claimed in claim 1, wherein the isolation of said polybutadiene rubber from the resultant 1,2-polymerization mixture is carried out by adding a precipitation agent to said resultant second polymerization mixture in step (E).

28. The process as claimed in claim 1, wherein the isolation of said polybutadiene rubber is carried out by evaporating volatile substances from the resultant 1,2-polymerization mixture.

29. The process as claimed in claim 1, wherein after said polybutadiene rubber is isolated from said 1,2-polymerization mixture, the isolation residue is subjected to a recovery procedure of a mixture of non-reacted 1,3-butadiene, said inert organic solvent, and said carbon disulfide.

30. The process as claimed in claim 29, wherein said recovered mixture of said non-reacted 1,3-butadiene, said inert organic solvent and said carbon disulfide is recycled to said step (A).

31. The process as claimed in claim 29, wherein said recovery is carried out by means of distillation.

* * * * *